(12) United States Patent
Sarkar et al.

(10) Patent No.: US 12,334,057 B2
(45) Date of Patent: Jun. 17, 2025

(54) METHOD AND SYSTEM FOR VISUAL CONTEXT AWARE AUTOMATIC SPEECH RECOGNITION

(71) Applicant: Tata Consultancy Services Limited, Mumbai (IN)

(72) Inventors: Chayan Sarkar, Kolkata (IN); Pradip Pramanick, Kolkata (IN); Ruchira Singh, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 273 days.

(21) Appl. No.: 18/333,983

(22) Filed: Jun. 13, 2023

(65) Prior Publication Data

US 2024/0038224 A1    Feb. 1, 2024

(30) Foreign Application Priority Data

Jul. 28, 2022  (IN) ............................. 202221043394

(51) Int. Cl.
    *G10L 15/16*    (2006.01)
    *G10L 15/06*    (2013.01)

(52) U.S. Cl.
    CPC ............ *G10L 15/16* (2013.01); *G10L 15/063* (2013.01)

(58) Field of Classification Search
    CPC ..... G10L 15/16; G10L 15/063; G10L 15/183; G10L 2015/085; G10L 15/083;

(Continued)

(56) References Cited

U.S. PATENT DOCUMENTS 10,867,595 B2 * 12/2020 Sriram .................. G06N 3/044
11,081,104 B1 *  8/2021 Su ......................... G06F 40/216
(Continued)

OTHER PUBLICATIONS

Wang, Xiaoqiang et al., "A Light-weight contextual spelling correction model for customizing transducer-based speech recognition systems", Title of the item: Audio and Speech Processing, Date: Aug. 2021, Publisher: Arxiv, Link: https://arxiv.org/pdf/2108.07493.pdf.

(Continued)

*Primary Examiner* — Michael Colucci
(74) *Attorney, Agent, or Firm* — Finnegan, Henderson, Farabow, Garrett & Dunner, LLP (57) ABSTRACT

Accuracy of transcript is of foremost importance in Automatic Speech Recognition (ASR). State of the art system mostly rely on spelling correction based contextual improvement in ASR, which is generally a static vocabulary based biasing approach. Embodiments of the present disclosure provide a method and system for visual context aware ASR. The method provides biasing using shallow fusion biasing approach with a modified beam search decoding technique, which introduces a non-greedy pruning strategy to allow biasing at the sub-word level. The biasing algorithm brings in the visual context of the robot to the speech recognizer based on a dynamic biasing vocabulary, improving the transcription accuracy. The dynamic biasing vocabulary, comprising objects in a current environment accompanied by their self and relational attributes, is generated using a bias prediction network that explicitly adds label to objects, which are detected and captioned via a state of the art dense image captioning network.

9 Claims, 5 Drawing Sheets

(58) Field of Classification Search
CPC ...... G06V 10/424; G06V 20/10; G06V 20/41; G06V 20/70; G06F 18/251; G06F 2218/10
See application file for complete search history.

(56) References Cited

U.S. PATENT DOCUMENTS

| | | | |
|---|---|---|---|
| 12,002,451 B1* | 6/2024 | Liu | G10L 15/16 |
| 12,087,306 B1* | 9/2024 | Le | G10L 15/28 |
| 2012/0033949 A1* | 2/2012 | Lu | G11B 27/28 |
| | | | 386/E5.028 |
| 2020/0357388 A1* | 11/2020 | Zhao | G06N 3/08 |
| 2024/0073219 A1* | 2/2024 | Maizels | H04L 63/0861 |

OTHER PUBLICATIONS

Le, Duc et al., "Deep Shallow Fusion for RNN-T Personalization", Title of the item: Audio and Speech Processing, Date: Nov. 2020, Publisher: Arxiv, Link: https://arxiv.org/pdf/2011.07754.pdf.

Li, Xiangyang, et al., "Learning Object Context for Dense Captioning", Title of the item: AAAI Technical Track: Vision, Date: 2018, vol. 33 (1), Publisher: AAAI, Link: https://ojs.aaai.org/index.php/AAAI/article/view/4886/4759.

* cited by examiner

METHOD AND SYSTEM FOR VISUAL CONTEXT AWARE AUTOMATIC SPEECH RECOGNITION

PRIORITY CLAIM

This U.S. patent application claims priority under 35 U.S.C. § 119 to: Indian Patent Application No. 202221043394, filed on Jul. 28, 2022. The entire contents of the aforementioned application are incorporated herein by reference.

TECHNICAL FIELD

The embodiments herein generally relate to the field of Automatic Speech Recognition (ASR) and, more particularly, to a method and system for visual context aware ASR.

BACKGROUND

Spoken interaction with a robot not only increases its usability and acceptability to any user, but it also provides a natural mode of interaction even for a novice user. Recent development of deep learning based end-to-end Automatic Speech Recognition (ASR) systems have achieved a very high accuracy as compared to traditional ASR systems. As a result, a huge surge is seen in speech based interface for many automated systems including robots. However, the accuracy of any state-of-the-art ASR gets significantly impacted based on the dialect of the speaker, distance of the speaker from the microphone, ambient noise, etc., particularly for novel and low-frequency vocabularies. These factors are often predominant in many robotic applications. This not only results in poor translation accuracy, but also impacts the instruction understanding and task execution capability of the robot. Thus, building improved ASR system for accurate task execution by addressing above practical challenges is an open area for research.

SUMMARY

Embodiments of the present disclosure present technological improvements as solutions to one or more of the above-mentioned technical problems recognized by the inventors in conventional systems.

For example, in one embodiment, a method for visual context aware Automatic Speech Recognition (ASR) is provided. The method includes performing via a robotic agent the steps comprising triggering, capture of an ego-view image of an environment of the robotic agent on detecting a speech input. Further, comprising detecting the ego-view image, one or more objects and associated text descriptions, by the robotic agent using a dense image captioning network. Further, comprising processing and filtering the text descriptions to explicitly label the text descriptions using a bias prediction network to generate a dynamic word vocabulary, wherein the dynamic word vocabulary providing a reduced space for a modified beam search decoding technique applied during generation of a final transcript for the speech input, wherein the dynamic word vocabulary comprises a list of biasing words having self-attributes and relational attributes associated with the one or more objects in the ego-view image. Furthermore, comprising dynamically compiling the dynamic word vocabulary into a trie in accordance with movement of the robotic agent within the environment, wherein the trie provides a visual context for the input speech in accordance with the one or more objects detected in the ego-view image. Further, comprising processing the speech input in a plurality of time steps, using an acoustic model, to generate in each time-step a probability distribution sequence over a character vocabulary, and biasing using the dynamic word vocabulary in accordance with the speech input. Furthermore, comprising iteratively decoding the probability distribution sequence generated in each time step into a transcript to eventually generate a final transcript using a modified beam search decoding technique, wherein the modified beam search decoding technique applies a modified sampling function, a contextual re-scoring function and a bias aware pruning function on the transcript generated in each iteration in accordance with the trie. Further, comprising performing a task understanding by processing the final transcript; and performing a task planning in accordance with the understood task.

In another aspect, a system for visual context aware Automatic Speech Recognition (ASR) is provided. The system comprises a memory storing instructions; one or more Input/Output (I/O) interfaces; and one or more hardware processors coupled to the memory via the one or more I/O interfaces, wherein the one or more hardware processors are configured by the instructions to perform via a robotic agent the steps comprising triggering, capture of an ego-view image of an environment of the robotic agent on detecting a speech input. Further, comprising detecting the ego-view image, one or more objects and associated text descriptions, by the robotic agent using a dense image captioning network. Further, comprising processing and filtering the text descriptions to explicitly label the text descriptions using a bias prediction network to generate a dynamic word vocabulary, wherein the dynamic word vocabulary providing a reduced space for a modified beam search decoding technique applied during generation of a final transcript for the speech input, wherein the dynamic word vocabulary comprises a list of biasing words having self-attributes and relational attributes associated with the one or more objects in the ego-view image. Furthermore, comprising dynamically compiling the dynamic word vocabulary into a trie in accordance with movement of the robotic agent within the environment, wherein the trie provides a visual context for the input speech in accordance with the one or more objects detected in the ego-view image. Further, comprising processing the speech input in a plurality of time steps, using an acoustic model, to generate in each time-step a probability distribution sequence over a character vocabulary, and biasing using the dynamic word vocabulary in accordance with the speech input. Furthermore, comprising iteratively decoding the probability distribution sequence generated in each time step into a transcript to eventually generate a final transcript using a modified beam search decoding technique, wherein the modified beam search decoding technique applies a modified sampling function, a contextual re-scoring function and a bias aware pruning function on the transcript generated in each iteration in accordance with the trie. Further, comprising performing a task understanding by processing the final transcript; and performing a task planning in accordance with the understood task.

In yet another aspect, there are provided one or more non-transitory machine-readable information storage mediums comprising one or more instructions, which when executed by one or more hardware processors causes a method for visual context aware Automatic Speech Recognition (ASR). The method includes performing via a robotic agent the steps comprising triggering, capture of an ego-view image of an environment of the robotic agent on detecting a speech input. Further, comprising detecting the ego-view image, one or more objects and associated text descriptions, by the robotic agent using a dense image captioning network. Further, comprising processing and filtering the text descriptions to explicitly label the text descriptions using a bias prediction network to generate a dynamic word vocabulary, wherein the dynamic word vocabulary providing a reduced space for a modified beam search decoding technique applied during generation of a final transcript for the speech input, wherein the dynamic word vocabulary comprises a list of biasing words having self-attributes and relational attributes associated with the one or more objects in the ego-view image. Furthermore, comprising dynamically compiling the dynamic word vocabulary into a trie in accordance with movement of the robotic agent within the environment, wherein the trie provides a visual context for the input speech in accordance with the one or more objects detected in the ego-view image. Further, comprising processing the speech input in a plurality of time steps, using an acoustic model, to generate in each time-step a probability distribution sequence over a character vocabulary, and biasing using the dynamic word vocabulary in accordance with the speech input. Furthermore, comprising iteratively decoding the probability distribution sequence generated in each time step into a transcript to eventually generate a final transcript using a modified beam search decoding technique, wherein the modified beam search decoding technique applies a modified sampling function, a contextual re-scoring function and a bias aware pruning function on the transcript generated in each iteration in accordance with the trie. Further, comprising performing a task understanding by processing the final transcript; and performing a task planning in accordance with the understood task.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

A general pipeline for any Automatic Speech Recognition (ASR) includes and acoustic model to generate a transcript from the received speech input, then perform task understanding and accordingly perform task execution. As can be understood, if the transcript is erroneous due to reasons such as dialect of the speaker, distance of the speaker from the microphone, ambient noise, etc., particularly for novel and low-frequency vocabularies, the executed task goes wrong. Thus, the accuracy of transcript is of foremost importance in ASR. State of the art system mostly rely on spelling correction based contextual improvement in ASR, which is generally a static vocabulary based biasing approach.

Embodiments of the present disclosure provide a method and system for visual context aware ASR. The system, also referred to as a Robust Speech Interface (RoSI), provides shallow fusion biasing approach with a modified beam search decoding technique, which introduces a non-greedy pruning strategy to allow biasing at the sub-word level. In an embodiment, the system is implemented in a mobile agent, such as robotic agent that moves constantly resulting in continuous change in the surrounding environments and object. The biasing algorithm brings in the visual context of the robot to the speech recognizer based on a dynamic biasing vocabulary, improving the transcription accuracy. The dynamic biasing vocabulary, comprising objects in a current environment accompanied by their self and relational attributes, is generated using a bias prediction network that explicitly adds label to objects, which are detected and captioned via a state of the art dense image captioning network.

Figure 1:
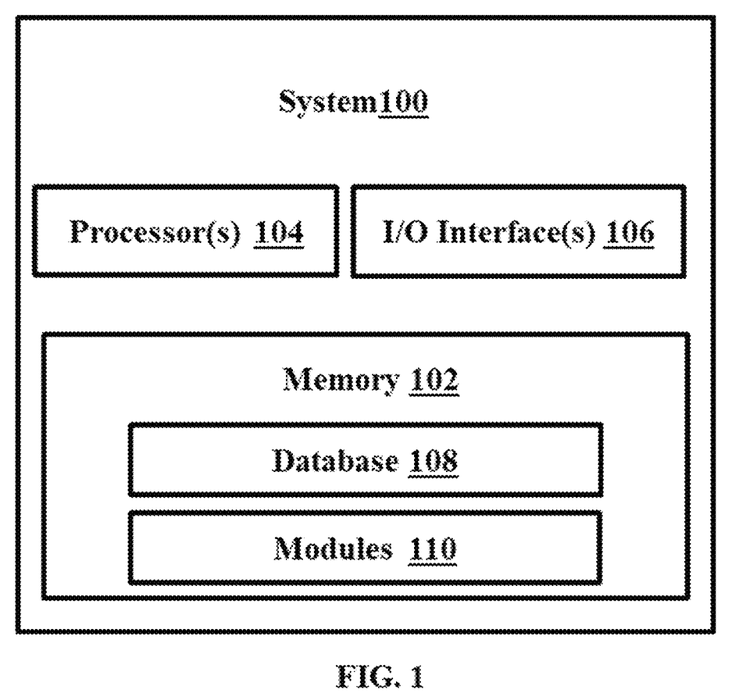
FIG. 1 is a functional block diagram of a system, for visual context aware Automatic Speech Recognition (ASR), in accordance with some embodiments of the present disclosure.
Figure 2A:
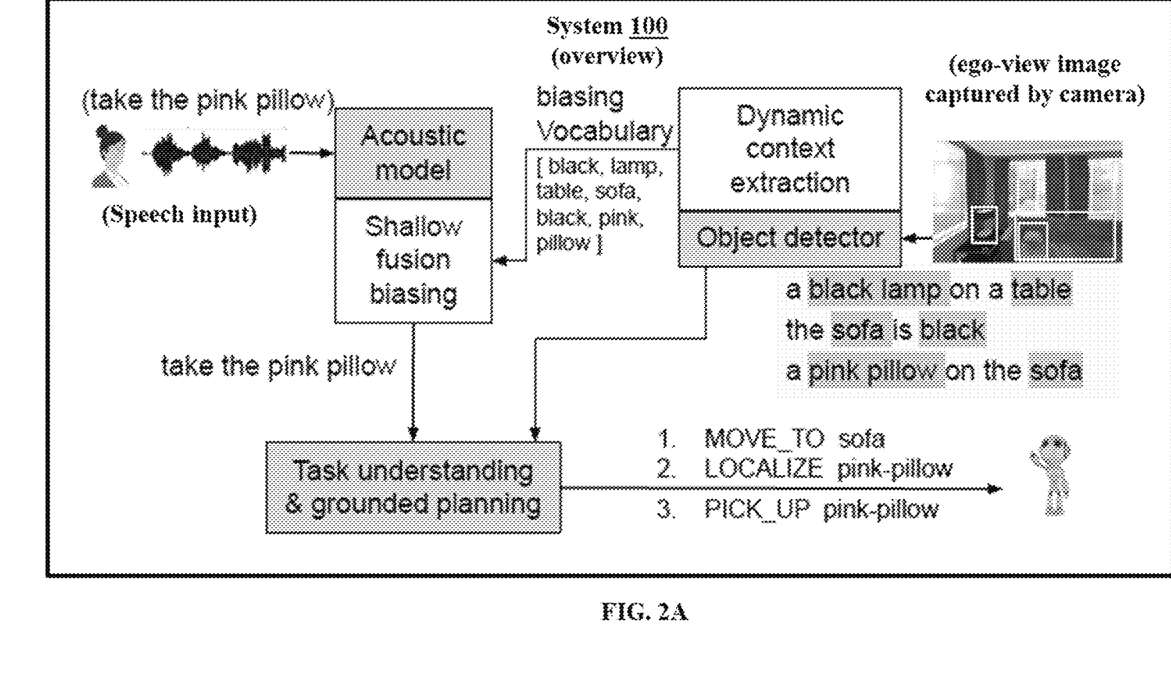
FIG. 2A a schematic overview of the system of FIG. 1, in accordance with some embodiments of the present disclosure.
Figure 2B:
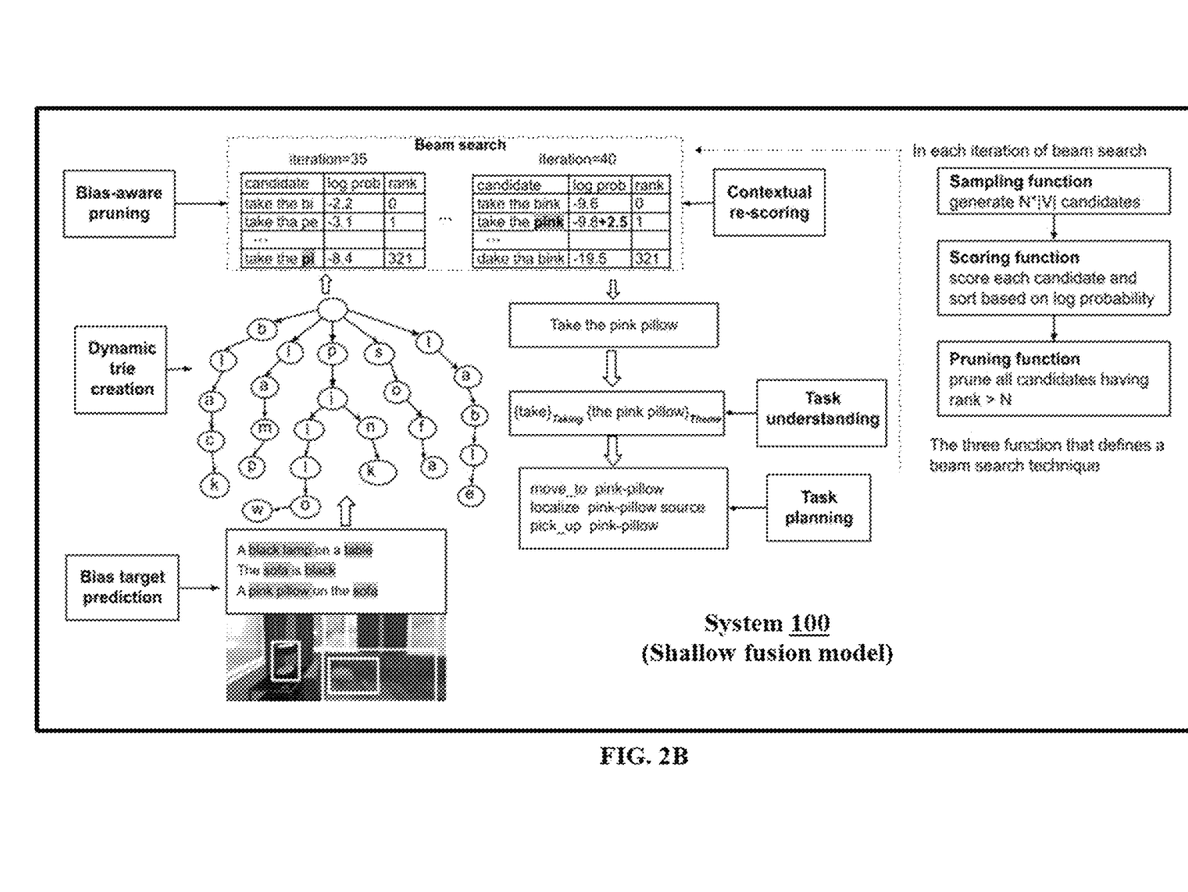
FIG. 2B illustrates detailed process pipeline of the system of FIG. 2A using a shallow fusion model for visual context based biasing for ASR, in accordance with some embodiments of the present disclosure.
Figure 3A:
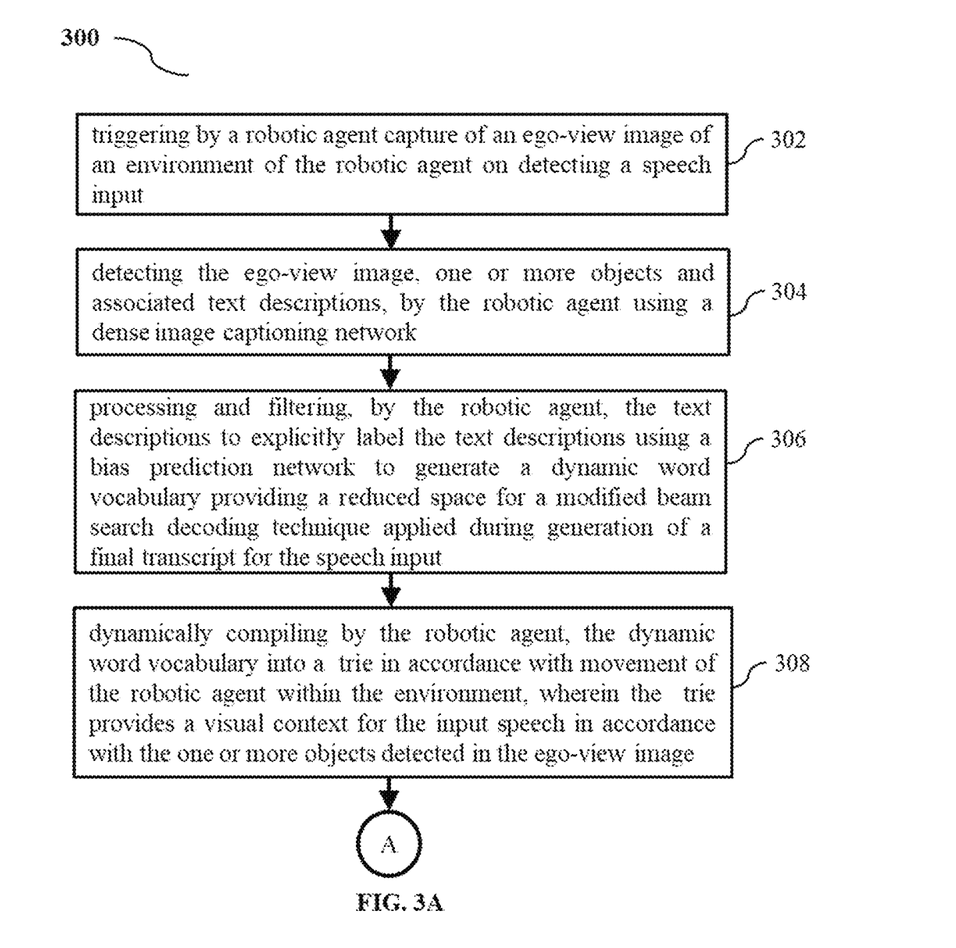
FIGS. 3A through 3B (collectively referred as FIG. 3) is a flow diagram illustrating a method for visual context aware Automatic Speech Recognition (ASR), using the system detailed in FIGS. 2A and 2B, in accordance with some embodiments of the present disclosure.
Figure 3B:
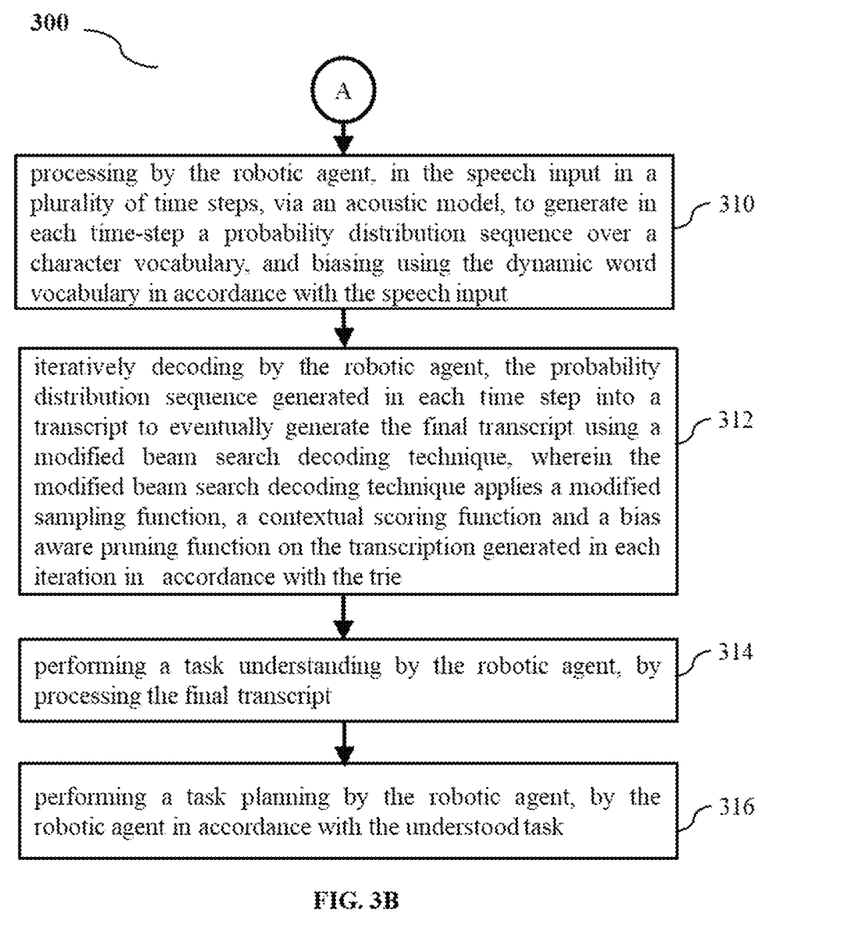

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 is a functional block diagram of a system 100, for visual context aware Automatic Speech Recognition (ASR), in accordance with some embodiments of the present disclosure.

In an embodiment, the system 100, also referred to as a Robust Speech Interface (RoSI) 100, includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110 such as a robotic agent (not shown) supported by a camera (not shown) equipped on the system (RoSI) 100 to capturing ego-view image of environment. As well known in the art, egocentric vision provides a unique perspective of the visual world that is inherently human-centric or centered around the wearer of the camera, herein the robotic agent. The robotic agent further comprises sub modules such as an acoustic model (depicted in FIG. 2A) integrated with a shallow fusion model (as detailed in FIG. 2B) implementing the shallow fusion biasing via the modified beam search decoder technique for visual context based ASR, a dense image captioning network (not shown) with a bias prediction network (not shown) to detect object in the ego-view image and generate a dynamic word vocabulary, also referred to as a dynamic biasing vocabulary (depicted in FIG. 2A), and the like. Further, the plurality of modules 110 include programs or coded instructions that supplement applications or functions performed by the system 100 for executing different steps involved in the process of visual context aware Automatic Speech Recognition (ASR), being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Further, the memory 102 may comprise information pertaining to input(s)/output(s) of each step performed by the processor(s) 104 of the system 100 and methods of the present disclosure.

Further, the memory 102 includes a database 108. The database (or repository) 108 may include a plurality of abstracted piece of code for refinement and data that is processed, received, or generated as a result of the execution of the plurality of modules in the module(s) 110. For example, the database may store, dynamic word vocabulary, also referred to as dynamic biasing vocabulary, and a trie generated from the dynamic word vocabulary. The trie, as well known in the art, also called digital tree or prefix tree, is a type of k-ary search tree, a tree data structure used for locating specific keys from within a set.

Although the database 108 is shown internal to the system 100, it will be noted that, in alternate embodiments, the database 108 can also be implemented external to the system 100, and communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to FIGS. 2A through FIG. 3.

FIG. 2A illustrates a schematic overview of the system of FIG. 1, in accordance with some embodiments of the present disclosure. As depicted, it can be understood that environment around robotic agent of the system 100 (RoSI) is not static but changing as the system navigates. The camera on the system 100 captures the ego-view images of the surrounding to enable the robot agent to accurately perform visual context aware ASR whenever any speech input to perform a task is detected.

In the conventional ASR systems, an acoustic model translates the audio into text. Then, it detects the set of objects in its vicinity using an object detector. Finally, it grounds the instruction, i.e., match the object mentioned in the task (command) and the objects detected in the vicinity to narrow down the target object before execution. If the audio translation is erroneous, the grounding can fail, which leads to failure in task execution. For example, even though a user mentioned "pink pillow", the translation can be "bink illow", which results in failure in task grounding. This is a technical challenge reducing the accuracy of robotic agent to perform defined tasks.

To address this technical challenge, the system 100 depicted in FIG. 2A and further detailed in FIG. 2B provides a biasing technique that can be integrated with an existing ASR model to improve its translation accuracy. Unlike the existing biasing techniques that use a static biasing vocabulary, the robotic agent of the system 100 utilizes the dynamic biasing vocabulary. Using an object detector, a bunch of captions are generated, i.e., a set of (natural language) phrases about the objects in scene (ego-view image captured by the camera) are generated. A biasing vocabulary is built using these generated captions on-the-go (dynamically). It can also be pre-computed whenever the robotic agent moves to a new location. The shallow fusion biasing algorithm that introduces a non-greedy pruning strategy is used to allow biasing at the sub-word level. The biasing algorithm is integrated with the ASR enabling visual context of the robot agent to the speech recognizer, improving its accuracy during transcription.

In one implementation, the system 100 adopts a connectionist temporal classification (CTC) based modeling known in the art in the baseline ASR model. The CTC based ASR model outputs a sequence of probability distributions over the target vocabulary y={$y_1, \ldots, y_T$} (usually characters), given an input speech signal with length L, x={$x_1, \ldots, x_L$}, L>T, thus computing, $$P(y|x) = \Pi_{i=1}^{T} P(y_i|x) \quad (1)$$

The output sequence with the maximum likelihood is usually approximated using a beam search well known in the art. During this beam search decoding, shallow-fusion biasing in the art, proposes re-scoring an output sequence hypothesis containing one or more biasing words. Assuming a list of biasing words/phrases is available before producing the transcription, a re-scoring function provides a new score for the matching hypothesis that is either interpolated or used to boost the log probability of the output sequence hypothesis. The same is provided below:

$$s(y) = \log P(y|x) - \lambda \log B(y) \quad (2a)$$

where B(y) provides a contextual biasing score of the partial transcription y and $\lambda$ is a scaling factor.

A major limitation of the above existing approach is ineffective biasing due to early pruning of hypotheses. To enable open-vocabulary speech recognition, ASR networks generally predict sub-word unit labels instead of directly predicting the word sequence. However, as the beam search keeps at most k candidates in each time-step i∈L, lower ranked hypotheses partially containing biasing words are pruned by the beam search before the word boundary is reached. To counter this, biasing at the sub-word units (grapheme/word-piece) by weight pushing is proposed in one of the prior art approaches. Biasing at the grapheme level improves recognition accuracy than word level biasing for speech containing bias, but the performance degrades for general speech where the bias context is irrelevant. Subsequently, two improvements are proposed in the art: i) biasing at the word-piece level and ii) utilizing known prefixes of the biasing terms to perform contextual biasing. Although word-piece biasing shows less degradation than grapheme level on general speech, it performs worse than word level biasing when using high biasing weights. Also, prefix-context based biasing in the art is ineffective when a biasing term occurs in out-of-context.

In contrast, the system 100 discloses an approach to retain the benefits of word-level biasing for general speech, also preventing early pruning of partially matching hypotheses. Moreover, the system 100 specifically targets transcribing human-robot dialogues that typically include descriptions of everyday-objects. Thus, the biasing words are seldom out-of-vocabulary (OOV) for standard language models used with ASR. This is in contrast to other existing biasing systems that focus on biasing OOV terms such as person names. The system 100 utilizes this distinction to achieve additional robustness to over-biasing, by incorporating an n-gram language model to contextually scale the biasing score. Given the transcribed instruction, the task understanding, and planning module performs task type classification, argument extraction, and task planning. The system 100 uses conditional random field (CRF) based model as proposed in the art. Specifically, the transcribed instruction is passed through a task-crf model that labels tokens in the transcription from a set of task types. Given the output of task-crf, an argument-crf model labels text spans in the instruction from a set of argument labels. This results in an annotated instruction such as,

[Take]$_{taking}$ [the pink pillow]$_{theme}$.

To perform a high-level task mentioned in the instruction (e.g., taking), the agent needs to perform a sequence of basic actions as produced by the task planner. The predicted task type is matched with a pre-condition and post-condition template, encoded in Planning Domain Definition Language (PDDL) works traditionally well known in the art. The template is populated by the prediction of the argument crf. Finally, a heuristic-search planner as provided in literature generates the plan sequence. The shallow fusion model is described in conjunction with FIG. 2B and the method of FIG. 3.

FIGS. 3A through 3B (collectively referred as FIG. 3) is a flow diagram illustrating a method for visual context aware Automatic Speech Recognition (ASR), using the system 100 detailed in FIGS. 2A and 2B, in accordance with some embodiments of the present disclosure.

In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 300, at step 302 of the method 300, the robotic agent implemented via the one or more hardware processors 104 captures an ego-view image of an environment of the robotic agent on detecting a speech input. The speech input is the oral command to perform a task given by end user such as human.

Visual Context Biasing: The probability distribution sequence produced by the acoustic model can conventionally be sub-optimally decoded in a greedy manner, i.e., performing an argmax computation each time-step and concatenating the characters to produce the final transcription. However, a greedy-decoding strategy is likely to introduce errors in the transcription that can be easily avoided by using beam search as mentioned in one or the prior works. However, the method disclosed further enhances the beam search technique reduce transcription errors by exploiting the embodied nature of the robotic agent which uses the ASR system.

Steps 304 through 312 explain the visual context biasing in conjunction with corresponding modules, wherein steps 304 and 306 refer to dynamic context extraction.

Dynamic Context Extraction: Upon receiving the speech input, the robotic agent captures an ego-view image, which is further processed to identify prior information about the environment that could be present in the speech. An existing approach of detecting all the objects present in the image and generating a textual description (captions) for each of them is used. However, the method 300 further processes the object textual descriptions using the bias target prediction network to extract the dynamic biasing vocabulary. As the robotic agent performs a discrete action (such as moving or rotating), a new ego-view is captured, updating the visual context. Transcribing any new speech input after the action is executed, is biased using the new context.

Thus, at step 304 of the method 300, the robotic agent implemented detects in the ego-view image, one or more objects and associated text descriptions (captions), using the dense image captioning network. The dense image captioning network, DenseCap proposed by work in the art is used to generate rich referring expressions of the objects that includes self attributes such as color, material, shape, etc., and various relational attributes. The DenseCap model uses a Faster R-CNN based region proposal network to generate arbitrarily shaped bounding boxes (as depicted in FIG. 2B) that are likely to contain objects-of-interest (Yang et al., 2017). The region features are produced by a convolutional network to predict object categories. The region features are further contextualized and fed into a recurrent network (Long short-term memory (LSTM)) to generate descriptions of the proposed regions. A pre-trained model is used for the experiments conducted, wherein the model was trained on the Visual Genome dataset available in the literature containing approximately 100,000 real-world images with region annotations, making the model applicable to diverse scenarios.

At step 306 of the method 300, the robotic agent processes and filters the text descriptions to explicitly label the text descriptions using the bias prediction network to generate a dynamic word vocabulary providing a reduced space for a modified beam search decoding technique applied during generation of a final transcript for the speech input, wherein the dynamic word vocabulary comprises a list of biasing words having self-attributes and relational attributes associated with the one or more objects in the ego-view image.

Dense image captioning: Conventional approaches may simply extract the tokens from the generated captions and consider the set of unique tokens (or n-grams) as the biasing vocabulary. However, a large biasing vocabulary could result in a performance degradation of the ASR system in case of irrelevant context, as shown in prior experiments. Therefore, the method 300 discloses a more efficient context extraction approach, where the generated captions are explicitly labelled using the bias target prediction network as depicted in FIG. 2B. Given a caption as sequence of word $\{w_1, \ldots, x_n\}$, the bias target prediction network predicts a sequence of labels $\{l_1, \ldots, l_n\}$ from the set of symbols S={B-B,I-B,O}, which denotes that the word is at the beginning, inside and outside of a biasing phrase. The bias target predictor is modelled as a lightweight Bidirectional LSTM (BiLSTM)-based network. The given word sequence is encoded using pre-trained GloVe embeddings referred in the literature, thus producing an embedding sequence $\{e_1, \ldots, e_n\}$. A hidden representation hi is further obtained for each word $w_i$ by concatenating the two hidden representations produced by the forward and backward pass of the LSTM network. '$h_i$' is fed to a feed-forward layer with softmax to produce a probability distribution over S, as:

$$h_i = [\vec{LSTM}(e_i, \vec{h}_{i-1}); \overleftarrow{LSTM}(e_i, \overleftarrow{h}_{i+1})] \quad (2b)$$

$$l_{1:n} = \text{argmax}_{l_i \in S} P(l_i | FFN(h_i))$$

At step 308 of the method 300, the robotic agent dynamically compiles the dynamic word vocabulary into the trie in accordance with movement of the robotic agent within the environment. As depicted in FIG. 2B the trie provides a visual context for the input speech in accordance with the one or more objects detected in the ego-view image. The trie includes the words from the dynamic biasing vocabulary as depicted. For example, based on the words in the dynamic vocabulary the trie can be b-l-a-c-k, p-i-n-k, p-i-l-l-o-w, t-a-b-l-e, and so on as depicted in FIG. 2B At step 310 of the method 300, the robotic agent processes the speech input in a plurality of time steps, via the acoustic model, to generate in each time-step a probability distribution sequence over a character vocabulary, and biasing using the dynamic word vocabulary in accordance with the speech input a depicted in FIG. 2B.

Once the dynamic word vocabulary is generated, then at step 312 of the method 300, the robotic agent iteratively decodes the probability distribution sequence generated in each time step into a transcript to eventually generate the final transcript using the modified beam search decoding technique. The modified beam search decoding technique applies a modified sampling function, a contextual re-scoring function and a bias aware pruning function on the transcription generated in each iteration in accordance with the trie.

In each iteration of the modified beam search, (i) a partial transcript of the input speech is extended using the trie to generate a set of candidate transcripts by the modified sampling functions, (ii) each candidate transcript among the set of transcripts is assigned a score by the contextual scoring function and sorted based on log probability, and (iii) a subset of candidates from the set of candidates that score above a predefined threshold are identified as candidates to be pruned by the bias aware pruning function to generate the transcript for next iteration level, until the final transcript is obtained.

To enable word-level biasing while preventing early pruning of grapheme-level biasing candidates, the generic beam search algorithm is modified. More specifically, the three general steps of the generic beam search decoding are modified as depicted in FIG. 2B to provide the modified sampling function, the contextual scoring function, and the bias aware pruning function. An overview of the modified beam search decoder is shown in Algorithm 1.

Algorithm 1: Bias-aware pruning for beam search decoding.

Input : A (Probability distribution over alphabet) * T (Time-steps) sized tensor, Beam width N, Hyper-parameter K, Biasing trie $B_T$.
Initialization: hypotheses=∅
1 for t ∈ T do
2  Sample at from $A_t$ using sampling function S
3  Generate N × $a_t$ candidates by extending each hypothesis
4  Compute sequence log-probability of N × $a_t$ candidates
5  for c in candidates do
6   if c ends a word boundary then
7    Rescore c with rescoring function R
8   end
9
10  end
11  Obtain H by sorting N × $a_t$ candidates by descending score
12  Initialize forward = {c ∈ H, rank(c) <= N}
13  Initialize prunable = {c ∈ H, rank(c) > N}
14  for c ∈ prunable do
15   Compute rescoring likelihood using Ψ
16  end
17  Sort prunable by descending rescoring likelihood
18  Compute k = K% of N
19  From forward, prune candidates having rank(c) > (N − k)
20  Append top-k candidates of prunable to forward
21  hypotheses← forward
22 end Output: Return top-N transcriptions Modified sampling function (also referred to as sampling function): In each time step of the beam search, existing hypotheses (partial transcription at time t) are extended with subword units from the vocabulary. Assuming the probability distribution over the vocabulary at time t is $A_t$, this generally results in the generation of $c_t = N \times |A_t|$ candidates, where N is the beam width and $|A_t|$ is a constant 328 denoting the dimension of the vocabulary. Initially, i.e., at t=1, the hypothesis set is empty and possibly for a few subsequent iterations, the number of generated candidates $|c_t|$ could be less than $N \times |A_t|$, if $|c_{t-1}| < N$, thus resulting in no hypothesis being pruned, regardless of its score. The sampling function selects a subset of vocabulary to extend the hypotheses at time t, defined as, $$S(A_t, C) = \{a_i : \Sigma_{i=1}^k P(A_{t_i}) \approx C\} \quad (3)$$

where C is a hyper-parameter and $P(A_{t_i})$ is the probability of the ith index in the probability distribution at time t. Essentially, $S$ starts pruning items from the vocabulary at time t when the cumulative probability reaches C. Although a similar pruning strategy has been applied previously in the literature for decreasing decoding latency, it is identified that such a sampling strategy also leads to robustness in biasing model, specially, in irrelevant context. By optimizing C on development set, the decoder can be prevented from generating very low-scoring candidates, acting as a counter to over-biasing.

Contextual re-scoring function (also referred to as Scoring function): After the generation of candidates, the score of each candidate is computed in the log space according to the CTC decoding objective (Hannun et al., 2014). The method 300 discloses a re-scoring function R that modifies the previously computed sequence score according to pre-set constraints. R is applied at the word boundary in each candidate, defined in the following, $$\mathcal{R}(S_c) = \begin{cases} S_C - \lambda \log P_{lm}(c_n) & c_n \in V_{lm,c_n} \epsilon B_T \\ S_C - \delta c_n & \notin V_{lm,c_n} \epsilon B_T \\ S_C + \gamma c_n & \notin V_{lm,c_n} \epsilon B_T \end{cases} \quad (4)$$

where $V_{lm}$ denotes the word vocabulary of a—language model, BT is the dynamic biasing trie, $c_n$ is the rightmost token in a candidate c, and $\gamma, \delta$ are hyper-parameters. $S_C$ is the log probability of the character sequence in c, which is approximated using the CTC decoding equation and interpolated using a n-gram word level language model (lm) score present in the literature as:

$$S_C = \log(P_{CTC}(c|x) P_{lm}(c_n|c_{n-1}, \ldots c_1)^\alpha |c|^\beta) \quad (5)$$

where $P_{CTC}$ is the sequence probability computed from the output of wav2vec2, $P_{lm}$ is the same n-gram lm and |c| denotes the word count in candidate 'c'. In eq. 4, the re-scoring function modifies the base sequence score according to the availability of certain contextual information. When the candidate ends in a word that is not OOV, it is likely that the language model has already provided a contextual boosting score (eq. 5) and therefore the biasing score boost is computed by simply scaling the lm-interpolated score using the unconditional unigram score of $c_n$.

This heuristic is inspired from one of the works in the art, but with two important distinctions. Firstly, the method 300 overcomes requirement of the class-based language modeling and simply uses the unigram score of a word-based language model. Secondly, the score of an OOV which is not a biasing word, is reduced by $\delta$. Since contextual score of an OOV is not available, simply the score is boosted by a fixed amount, i.e., $\gamma$.

Bias-aware pruning: As the contextual re-scoring function for word-level biasing is applied at the word boundary, candidates can be pruned early without bias being applied, which could be otherwise completed in a valid word from the trie and re-scored accordingly. The method 300 attempts to prevent this by introducing a unique pruning strategy. A re-scoring likelihood function iv is defined that scores candidates to be pruned according to the beam width threshold. As shown in the Algorithm 1, the candidates are divided into a forward and a prunable set. The forward set represents the set of candidates ranked according to their sequence scores, after applying R. The genetic beam search decoding algorithm makes a greedy, i.e., locally optimal decision at this point to simply use the forward set as hypotheses for the next time-step and discard the candidates in prunable. Instead, the method 300 formulates $\Psi$, which has access to hypothetical, non-local information of future time-steps from BT, to take a non-greedy decision. The re-scoring likelihood score calculates the probability of a candidate being re-scored at a subsequent stage of the beam search. Its value is approximated by the following interpolation, $$\psi = (S_c, nl) = S_c + \sigma \log\left(\frac{1}{nl}\right) \quad (6)$$

where nl (nodes to leaf) is the minimum no of nodes to reach a leaf node in BT and $\sigma$ is a scaling factor, optimized as a hyper-parameter. Essentially, the re-scoring likelihood is calculated as a weighted factor of—i) how soon a re-scoring decision can be made which is further approximated by counting the number of character nodes to complete a full word in BT and ii) the candidate's score which approximates the joint probability of the candidate's character sequence, given the audio input. In a special case when $\sigma$ is set to zero, $\Psi$ simply represents the original order in which the candidates are sorted after re-scoring. This calculation is performed for the candidates in the prunable set and then swap the bottom-k candidates in the forward set with top-k candidates in the prunable set.

Once the final transcript is created at step 312, post bias aware pruning, then at step 314 of the method 300, the robotic agent performs a task understanding by processing the final transcript. The task understanding process from a generated transcript is well known in the art and not explained here for brevity.

At step 316 of the method 300, the robotic agent performs the task planning by the robotic agent in accordance with the understood task. The task planning process based on the task understanding is well known in the art and not explained here for brevity.

The generating of the dynamic word vocabulary is dynamic process, which is triggered for every successive speech input, to capture varying visual context based on change in the environment of the robotic agent.

Experiments:

Data: To perform speech recognition experiments, a total of 1050 recordings of spoken instructions given to a robot are taken. To collect the recordings, a total of 233 image instruction pairs are collected. The images are extracted from a photo-realistic robotic simulator in the art (Talbot et al., 2020) and two volunteers wrote the instruction for the robot for each given image. The written instructions spoken by three different speakers (one female, two male) were recorded. Additionally recorded the instructions using two different text so-speech (TTS) models2, producing speech as a natural female speaker. The dataset is divided into validation and test splits. The validation set contains 315 instruction recordings (≈30%) and the test set contains 735 recordings.

Baselines: The system 100 implementing the method 300 is compared with several baselines as described in the following. All the baselines use a standard CTC beam search decoder implementation 3, with modified scoring functions (in bias-based models only) as described below.

Base—This is a pre-trained wav2vec2 model used as the baseline acoustic model. Specifically, the wav2vec2-large variant known in the art is used (Baevski et al., 2020), fine-tuned on Libri Speech (Panayotov et al., 2015).

Base+LM—A 3-gram, word vocabulary, language model trained on LibriSpeech text (Panayotov et al., 2015) is used. The language model probabilities are interpolated using eq. 5.

Base+WB—A Word-level Biasing approach that rescores LM-interpolated scores on word boundaries is used. This is similar to the word level biasing described in (Williams et al., 2018), but here a fixed boost for bias is used Base+WBctx—A Word-level Bias is used with contextual rescoring using unigram log probability from LM. This is similar to (Kang 530 and Zhou, 2020), but instead of class-based estimation, word-based LM probability, i.e., by setting $\delta=0$ in eq. 4 is used.

TABLE 1

(Optimal hyper-parameter values from search spaces. N is not optimized, and a standard value is used.)

| Parameter | Value | Search space |
|---|---|---|
| N | 100 | — |
| C | 0.991 | [0.96, 0.9999] |
| Λ | 1.424 | [0.005, 2.9] |
| δ | 10.33 | [0.1, 14.0] |
| γ | 13.31 | [0.1, 14.0] |
| α | 0.788 | [0.005, 2.9] |
| β | 0.119 | [0.005, 3.9] |
| σ | 10.91 | [0.001, 14.0] |
| K | 24 | [1, 35] |

TABLE 2

(Speech recognition results compared to baseline systems.)

| Model | WER ↓ | WERR ↑ | TA ↑ |
|---|---|---|---|
| Base | 20.83 | — | 53.47 |
| Base + LM | 18.29 | 12.19 | 53.07 |
| Base + WB | 15.55 | 25.35 | 68.57 |
| Base + WB$^{ctx}$ | 15.38 | 26.16 | 68.71 |
| RoSI | 8.48 | 59.28 | 73.81 |

Optimization: All hyper-parameters are optimized (except for the beam width N) for the system 100 (RoSI) and the baselines with the same validation set. A Bayesian optimization toolkit 4 is used and separate optimization experiments are performed for the baselines and the shallow fusion model of the RoSI, with a word error rate (WER) minimization objective. The same bounds are used for the common parameters, set the same random seed for all the models, and each optimization experiment is run for 50 trials. The optimal hyper-parameter values and the corresponding search spaces for the shallow fusion model are shown in Table 1. Main results. Primarily WER metric5 is used for evaluation. A relative metric is also shown, namely word error rate reduction (WERR) proposed in the art. (Leng et al., 2021). Additionally, a highly pessimistic metric, namely transcription accuracy (TA), which computes an exact match accuracy of the entire transcription.

The results of the experiments on the test set are shown in Table 2. Without any modification, the base ASR system produces an WER around 21% and TA around 54%. Even though predicting every word correctly is not equally important for task prediction and grounding, still these numbers in general do not represent the expected accuracy for a practical ASR setup in a robot. The LM interpolation reduces the WER by 12%, but TA is slightly decreased by 0.75%. Using word-level bias (Base+WB) results in a significant reduction in WER (25%) and improvement in TA (28% relative). Compared to Base+LM, WERR in Base+WB is 15% and TA improvement is around 30% relative. This again shows that even word-level biasing can effectively improve the ASR's accuracy, provided the biasing vocabulary can be predicted correctly. The Base+WBctx model performs slightly better than Base+WB, the WERR improving 26% compared to Base and 1% compared to Base+WB. Improvement in TA with respect to Base+WB is also minimal, i.e., 575 0.2%. To analyze this, the percentage of the biasing words is that are OOV's in the test set are calculated, which is found to be 9.5%. Thus, due to lack of many OOV-biasing terms, the fixed boost part of the rescoring model in Base+WBctx was not triggered as much, and model could not significantly discriminate between the scores of OOV and non-OOV biasing terms.

The modified beam search decoder technique disclosed herein enables achieving a WER of, significantly outperforming the best baseline, i.e., Base+WBctx in both WER (45% relative WERR) and TA (7.4% relative improvement) metrics. Compared to the unmodified ASR model, the improvements are substantial, 59.3% in WERR and 589 38% in TA.

Ablation experiments: Sampling and pruning function We experiment with no sampling, i.e., setting C=1 in the sampling function S (eq. 3) and setting σ=0 in the rescoring likelihood equation (eq. 6). The results are listed in Table 3.

TABLE 3

(Effect of modifying sampling and pruning strategies.)

| Biasing model | WER | WERR | TA |
|---|---|---|---|
| Ours, C = 1 | 10.98 | 47.29 | 71.84 |
| RoSI, σ = 0 | 9.68 | 53.53 | 71.98 |

The first experiment shows that the sampling function is effective in the biasing algorithm 1. Although without it, 47.29% WERR is achieved from the base model, which is much higher than other baselines. The second experiment shows that the rescoring likelihood formulation improves the biasing effect, 53.53% vs. 59.28% WERR, and improves the TA metric by 2.5%. Anti-context results Biasing models make a strong assumption of the biasing vocabulary being relevant to the speech, i.e., a subset of the biasing vocabulary is pronounced in the speech. While this is often true when giving instructions to an embodied agent, it is important to evaluate biasing models against adversarial examples to measure degradation due to biasing. In the anti-context setting, all words are deliberately removed from the dynamic biasing vocabulary that are present in the textual instruction. The results of anti-context experiments in Table 4.

TABLE 4

(Speech recognition results in anti-context setting. WERR is relative to the Base model and WERR* is relative to corresponding row for valid-context results (Table 2 and Table 3) for the same model.)

| Biasing model | WER | WERR | WERR* | TA |
|---|---|---|---|---|
| WB | 20.58 | 1.21 | −32.3 | 52.38 |
| WBctx | 20.96 | −0.62 | −36.3 | 51.16 |
| RoSI, C = 1 | 14.36 | 31.1 | −30.8 | 61.51 |
| RoSI, σ = 0 | 12.72 | 38.9 | −31.4 | 62.86 |
| RoSI | 11.09 | 46.8 | −30.8 | 65.85 |

The shallow fusion model herein has the least relative degradation compared to previous results in valid contexts. Even though all the biasing models are applied at word-level, prior experiments has shown that using sub-word level biasing often results in much worse degradation (Zhao et al., 2019; Gourav et al., 2021). Also, the relative degradation for all variants of the shallow fusion model are lower than the baselines. More importantly, the absolute WER and TA values are still much better than the unmodified ASR and other baselines, even in incorrect context.

Thus, the method to utilizes contextual information from an embodied agent's visual observation in its speech interface. In particular, the modified beam search decoder technique provides efficient biasing of a speech recognition model using prior visual context. The visual contextual biasing approach disclosed herein improves the performance of a speech recognition model when applied to transcribing spoken instructions given to a robot. The method shows less degradation than other approaches in the art when the extracted visual context is irrelevant to the speech. Even in adversarial context, the accuracy of the system 100 is well beyond the accuracy of the unmodified speech recognition model (standard ASRs).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for automatic speech recognition, the method comprising:
   triggering, by a robotic agent implemented via one or more hardware processors, capture of an ego-view image of an environment of the robotic agent on detecting a speech input;
   detecting the ego-view image, one or more objects and associated text descriptions, by the robotic agent using a dense image captioning network;
   processing and filtering, by the robotic agent, the text descriptions to explicitly label the text descriptions using a bias prediction network to generate a dynamic word vocabulary, wherein the dynamic word vocabulary providing a reduced space for a modified beam search decoding technique applied during generation of a final transcript for the speech input, wherein the dynamic word vocabulary comprises a list of biasing words having self-attributes and relational attributes associated with the one or more objects in the ego-view image;
dynamically compiling, by the robotic agent, the dynamic word vocabulary into a trie in accordance with movement of the robotic agent within the environment, wherein the trie provides a visual context for the input speech in accordance with the one or more objects detected in the ego-view image;
processing, by the robotic agent, the speech input in a plurality of time steps, using an acoustic model, to generate in each time-step a probability distribution sequence over a character vocabulary, and biasing using the dynamic word vocabulary in accordance with the speech input;
iteratively decoding, by the robotic agent, the probability distribution sequence generated in each time step into a transcript to eventually generate a final transcript using a modified beam search decoding technique, wherein the modified beam search decoding technique applies a modified sampling function, a contextual re-scoring function and a bias aware pruning function on the transcript generated in each iteration in accordance with the trie;
performing a task understanding, by the robotic agent, by processing the final transcript; and
performing a task planning, by the robotic agent, in accordance with the understood task.

2. The processor implemented method of claim 1, wherein generating of the dynamic word vocabulary is a dynamic process, which is triggered for every successive speech input, to capture varying visual context based on change in the environment of the robotic agent.

3. The processor implemented method of claim 1, wherein in each iteration of the modified beam search,
   a partial transcript of the input speech is extended using the trie to generate a set of candidate transcripts by the modified sampling functions,
   each candidate transcript among the set of transcripts is assigned a score by the contextual scoring function and sorted based on log probability, and
   a subset of candidates from the set of candidates that score above a predefined threshold are identified as candidates to be pruned by the bias aware pruning function to generate the transcript for next iteration level, until the final transcript is obtained.

4. A system for automatic speech recognition, the system comprising:
   a memory storing instructions;
   one or more Input/Output (I/O) interfaces; and
   one or more hardware processors coupled to the memory via the one or more I/O interfaces, wherein the one or more hardware processors are configured by the instructions to implement a robotic agent configured to:
   trigger, capture of an ego-view image of an environment of the robotic agent on detecting a speech input;
   detect the ego-view image, one or more objects and associated text descriptions, by the robotic agent using a dense image captioning network;
   process and filter the text descriptions to explicitly label the text descriptions using a bias prediction network to generate a dynamic word vocabulary, wherein the dynamic word vocabulary providing a reduced space for a modified beam search decoding technique applied during generation of a final transcript for the speech input, wherein the dynamic word vocabulary comprises a list of biasing words having self-attributes and relational attributes associated with the one or more objects in the ego-view image;
   dynamically compile the dynamic word vocabulary into a trie in accordance with movement of the robotic agent within the environment, wherein the trie provides a visual context for the input speech in accordance with the one or more objects detected in the ego-view image;
   process the speech input in a plurality of time steps, using an acoustic model, to generate in each time-step a probability distribution sequence over a character vocabulary, and biasing using the dynamic word vocabulary in accordance with the speech input;
   iteratively decode the probability distribution sequence generated in each time step into a transcript to eventually generate a final transcript using a modified beam search decoding technique, wherein the modified beam search decoding technique applies a modified sampling function, a contextual re-scoring function and a bias aware pruning function on the transcript generated in each iteration in accordance with the trie;
   perform a task understanding by processing the final transcript; and
   perform a task planning in accordance with the understood task.

5. The system of claim 4, wherein generating of the dynamic word vocabulary is a dynamic process, which is triggered for every successive speech input, to capture varying visual context based on change in the environment of the robotic agent.

6. The system of claim 4, wherein in each iteration of the modified beam search,
   a partial transcript of the input speech is extended using the trie to generate a set of candidate transcripts by the modified sampling functions,
   each candidate transcript among the set of transcripts is assigned a score by the contextual scoring function and sorted based on log probability, and
a subset of candidates from the set of candidates that score above a predefined threshold are identified as candidates to be pruned by the bias aware pruning function to generate the transcript for next iteration level, until the final transcript is obtained.

7. One or more non-transitory machine-readable information storage mediums comprising one or more instructions which when executed by one or more hardware processors cause:
   triggering, by a robotic agent implemented by the one or more hardware processors, capture of an ego-view image of an environment of the robotic agent on detecting a speech input;
   detecting the ego-view image, one or more objects and associated text descriptions, by the robotic agent using a dense image captioning network;
   processing and filtering, by the robotic agent, the text descriptions to explicitly label the text descriptions using a bias prediction network to generate a dynamic word vocabulary, wherein the dynamic word vocabulary providing a reduced space for a modified beam search decoding technique applied during generation of a final transcript for the speech input, wherein the dynamic word vocabulary comprises a list of biasing words having self-attributes and relational attributes associated with the one or more objects in the ego-view image;

dynamically compiling, by the robotic agent, the dynamic word vocabulary into a trie in accordance with movement of the robotic agent within the environment, wherein the trie provides a visual context for the input speech in accordance with the one or more objects detected in the ego-view image;

processing, by the robotic agent, the speech input in a plurality of time steps, using an acoustic model, to generate in each time-step a probability distribution sequence over a character vocabulary, and biasing using the dynamic word vocabulary in accordance with the speech input;

iteratively decoding, by the robotic agent, the probability distribution sequence generated in each time step into a transcript to eventually generate a final transcript using a modified beam search decoding technique, wherein the modified beam search decoding technique applies a modified sampling function, a contextual re-scoring function and a bias aware pruning function on the transcript generated in each iteration in accordance with the trie;

performing a task understanding, by the robotic agent, by processing the final transcript; and performing a task planning, by the robotic agent, in accordance with the understood task.

8. The one or more non-transitory machine-readable information storage mediums of claim 7, wherein generating of the dynamic word vocabulary is a dynamic process, which is triggered for every successive speech input, to capture varying visual context based on change in the environment of the robotic agent.

9. The one or more non-transitory machine-readable information storage mediums of claim 7, wherein in each iteration of the modified beam search, a partial transcript of the input speech is extended using the trie to generate a set of candidate transcripts by the modified sampling functions, each candidate transcript among the set of transcripts is assigned a score by the contextual scoring function and sorted based on log probability, and a subset of candidates from the set of candidates that score above a predefined threshold are identified as candidates to be pruned by the bias aware pruning function to generate the transcript for next iteration level, until the final transcript is obtained.

* * * * *